United States Patent
Ghyme et al.

(10) Patent No.: US 9,563,969 B2
(45) Date of Patent: Feb. 7, 2017

(54) METHOD OF GENERATING IMPLICIT TERRAIN DATA BY PERFORMING LOSSLESS COMPRESSION AND LOSSY COMPRESSION AND ELECTRONIC APPARATUS FOR PERFORMING THE METHOD

(71) Applicant: Electronics and Telecommunications Research Institute, Daejeon (KR)

(72) Inventors: Sang Won Ghyme, Daejeon (KR); Il Kwon Jeong, Daejeon (KR)

(73) Assignee: ELECTRONICS AND TELECOMMUNCATIONS RESEARCH INSTITUTE, Daejeon (KR)

( * ) Notice: Subject to any disclaimer, the term of this patent is extended or adjusted under 35 U.S.C. 154(b) by 193 days.

(21) Appl. No.: 14/469,467

(22) Filed: Aug. 26, 2014

(65) Prior Publication Data
US 2015/0146940 A1  May 28, 2015

(30) Foreign Application Priority Data

Nov. 27, 2013 (KR) .................... 10-2013-0145341
Aug. 26, 2014 (KR) .................... 10-2014-0111420

(51) Int. Cl.
G06T 9/00 (2006.01)
G06T 17/05 (2011.01)
H04N 19/12 (2014.01)

(52) U.S. Cl.
CPC ............ *G06T 9/001* (2013.01); *G06T 17/05* (2013.01); *H04N 19/12* (2014.11)

(58) Field of Classification Search
CPC .......... G06T 9/001; G06T 17/05; H04N 19/12
See application file for complete search history.

(56) References Cited

U.S. PATENT DOCUMENTS

2013/0169629 A1   7/2013   Shin et al.

FOREIGN PATENT DOCUMENTS

KR   10-2008-0050310 A   6/2008

OTHER PUBLICATIONS

Hormann, Kai, Salvatore Spinello, and Peter Schröder. "C1-Continuous Terrain Reconstruction from Sparse Contours." VMV. 2003.*
Garland, Michael, and Paul S. Heckbert. "Fast polygonal approximation of terrains and height fields." (1995).*
Joachim Pouderoux, Ireneusz Tobor, Jean-Christophe Gonzato, Pascal Guitton. Adaptive Hierarchical RBF Interpolation for Creating Smooth Digital Elevation Models. Proceedings of the Twelfth ACM International Symposium on Advances in Geographical Information System 2004, 2004, United States. pp. 232{240, 2004.*

(Continued)

*Primary Examiner* — Bhavesh Mehta
*Assistant Examiner* — Menatoallah Youssef

(57) ABSTRACT

The present invention relates to a method of generating implicit terrain data and an electronic apparatus for performing the method, and more particularly to a method of generating implicit terrain data and an electronic apparatus which are capable of minimizing a size of data while maintaining geographical quality of original terrain data.

16 Claims, 4 Drawing Sheets

(56) References Cited

OTHER PUBLICATIONS

Demaret, Laurent, et al. "Adaptive thinning for terrain modelling and image compression." Advances in multiresolution for geometric modelling. Springer Berlin Heidelberg, 2005. 319-338.*
Joachim Pouderoux et al., "Adaptive Hierarchical RBF Interpolation for Creating Smooth Digital Elevation Models", Proceedings of the Twelfth ACM International Symposium on Advances in Geographical Information System 2004, Etats-Unis d'Amerique (2004), Jan. 20, 2009, version 1.
Charles Whitlock, "N 3463 SC 24 Meetings in Sydney", ISO/IEC JTC 1/SC 24 N 3463, May 3, 2013.
Charles Whitlock, "N 3523 WG8 Recommendations—Sydney 2013", ISO/IEC JTC1/SC 24 N 3523, Sep. 4, 2013.
Sang-Won Ghyme, "Sketch-based Terrain Modeling", pp. 1-9, Aug. 26, 2013, Electonics and Telecommunications Research Institute.

* cited by examiner

METHOD OF GENERATING IMPLICIT TERRAIN DATA BY PERFORMING LOSSLESS COMPRESSION AND LOSSY COMPRESSION AND ELECTRONIC APPARATUS FOR PERFORMING THE METHOD

TECHNICAL FIELD

The present invention relates to a method of generating implicit terrain data and an electronic apparatus performing the method, and more particularly to a method of generating implicit terrain data based on a method of interpolating an implicit surface using a basis function.

BACKGROUND ART

In recent years, digital maps are widely used for cars, ships and air planes to check a location. Digital maps, which are utilized in various application systems based on a geographical information system (GIS), construct three-dimensional (3D) terrain via processing of digital map data stored in a storage device through a computer and represent the terrain via a display apparatus.

Digital maps are rendered by terrain modeling, wherein a digital elevation model (DEM) or contour line model is available. A DEM represents digital terrain via interpolation between height values (elevations) at grid points at regular intervals. A digital contour line model represents terrain through interpolation between contour lines.

A digital contour line model has a remarkably small data size as compared with a DEM but is not precise. A DEM is obtained by reading aerial photographs or satellite images and provide data with various resolutions based on an interval between grid points. Precision of terrain is determined on an interval between grid points and thus ultimately depends on a resolution of a DEM. High-resolution terrain data is precise but needs a substantially great data size, whereas low-resolution terrain data is not precise but needs a small data size.

Active use of high-resolution terrain data of digital maps is difficult due to limitation on computer resources available to provide terrain. In particular, only limited computer resources are allowed to be mounted in transportations frequently using digital maps, such as a car, ship and air plane, making it difficult to manage high-capacity data.

DISCLOSURE OF INVENTION

Technical Goals

The present invention is conceived to solve the foregoing problems, and an aspect of the present invention is aimed at providing a terrain modeling method of capable of considerably reducing a size of stored data while maintaining quality of original terrain data.

Another aspect of the present invention is aimed at providing a terrain modeling method of capable of minimizing management and operation of terrain model data having different resolutions.

Technical Solutions

According to an aspect of the present invention, there is provided a method of generating implicit terrain data, the method including constructing implicit terrain data from original terrain data; performing lossless compression on the implicit terrain data; reconstructing the losslessly compressed implicit terrain data; and performing lossy compression on the reconstructed implicit terrain data.

The constructing may construct the implicit terrain data using a height value of a node forming the original terrain data.

The performing of the lossless compression may include extracting initial characteristic nodes from nodes of the implicit terrain data; generating an implicit surface of the implicit terrain data by interpolating the initial characteristic nodes; and adding characteristic nodes using the original terrain data and the implicit surface.

The initial characteristic nodes may be nodes set first according to an interpolation method for generating an implicit surface among the implicit terrain data, and the characteristic nodes may be nodes added in consideration of a preset tolerance based on comparison between a height value of the nodes of the original terrain data and a height value of the implicit surface.

The implicit surface may include a height value of a random position through an interpolation between an initial characteristic node representing a preset height value and the initial characteristic nodes.

The adding may add a node having a height value of a position having a great height value error of original terrain to the implicit terrain as a characteristic node in order to decrease a difference between a height value of nodes forming the original terrain data and a height value of the implicit surface obtained by interpolating the initial characteristic nodes after comparing the height value of nodes and the height value of the implicit surface.

The reconstructing may reconstruct the losslessly compressed implicit terrain data by rearranging the added characteristic nodes using a characteristic line representing a medial axis connecting characteristic points of the original terrain data, and the characteristic line may be generated by analyzing the original terrain data and connecting characteristic points forming a valley and a ridge.

The rearranging may rearrange the characteristic nodes in proportion to a distance between the characteristic line and the added characteristic nodes.

The performing of the lossy compression may reduce a size of the implicit terrain data by sequentially removing the rearranged characteristic nodes from the reconstructed implicit terrain data, from a back position in order of the characteristic nodes.

The method may further include visualizing the lossily compressed implicit terrain data by converting the implicit terrain data into a mesh form.

The visualizing may visualize the implicit terrain data by calculating the implicit terrain data to extract a height value of each of nodes according to a resolution, connecting three-dimensional (3D) coordinates of the nodes to generate a mesh, and mapping the generated mesh to a texture.

According to another aspect of the present invention, there is provided an electronic apparatus which generates implicit terrain data, the electronic apparatus including a processor, wherein the processor conducts generating implicit terrain data using a height value of nodes forming original terrain data; performing lossless compression using nodes of the implicit terrain data; reconstructing the losslessly compressed implicit terrain data; and performing lossy compression on the reconstructed implicit terrain data using the original terrain data and the implicit terrain data.

The performing of the lossless compression may include extracting initial characteristic nodes from the implicit terrain data; generating an implicit surface of the implicit terrain data by interpolating the initial characteristic nodes; and adding characteristic nodes using the original terrain data and the implicit surface.

The implicit surface may include a height value of a random position through an interpolation between an initial characteristic node representing a preset height value and the initial characteristic nodes.

The adding may add a node having a height value of a position having a great height value error of original terrain to the implicit terrain as a characteristic node in order to decrease a difference between a height value of nodes forming the original terrain data and a height value of the implicit surface obtained by interpolating the initial characteristic nodes after comparing the height value of nodes and the height value of the implicit surface.

The reconstructing may reconstruct the losslessly compressed implicit terrain data by rearranging the added characteristic nodes using a characteristic line representing a medial axis connecting characteristic points of the original terrain data, and the characteristic line may be generated by analyzing the original terrain data and connecting characteristic points forming a valley and a ridge.

The rearranging may rearrange the characteristic nodes in proportion to a distance between the characteristic line and the added characteristic nodes.

The performing of the lossy compression may reduce a size of the implicit terrain data by sequentially removing the rearranged characteristic nodes from the reconstructed implicit terrain data, from a back position in order of the characteristic nodes.

The electronic apparatus may further include visualizing the lossily compressed implicit terrain data by converting the implicit terrain data into a mesh form.

The visualizing may visualize the implicit terrain data by calculating the implicit terrain data to extract a height value of each of nodes according to a resolution, connecting 3D coordinates of the nodes to generate a mesh, and mapping the generated mesh to a texture.

Effects of Invention

A method of generating implicit terrain data and an electronic apparatus for performing the method perform lossless compression and lossy compression on implicit terrain data, thereby minimizing a size of data used as the implicit terrain data while optimally maintaining geographical quality of original terrain data.

A method of generating implicit terrain data and an electronic apparatus for performing the method interpolate an implicit surface of implicit terrain data corresponding to terrain with a resolution of original terrain data without any separate process, thereby conveniently generating implicit terrain data without management of the original terrain data with various resolutions.

BEST MODE FOR CARRYING OUT THE INVENTION

Hereinafter, exemplary embodiments of the present invention will be described in detail with reference to the accompanying drawings.

Figure 1:
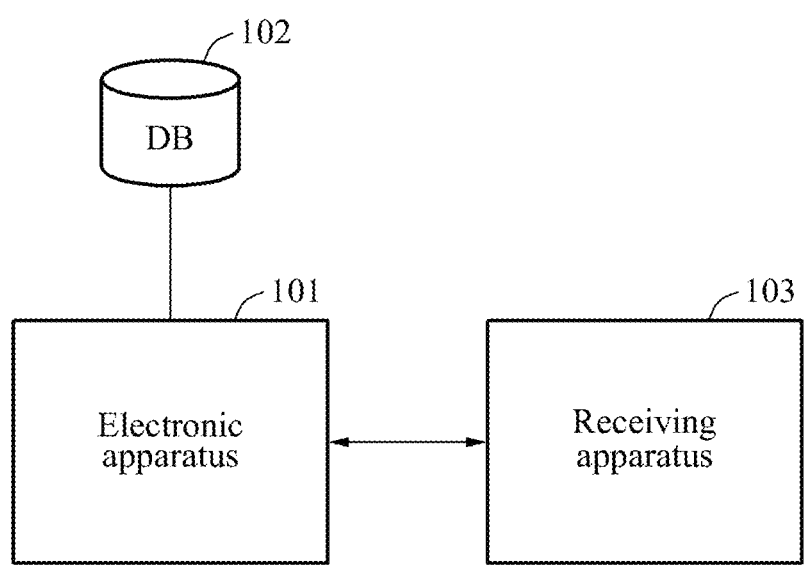
FIG. 1 illustrates an electronic apparatus which generates implicit terrain data according to an embodiment.

FIG. 1 illustrates an electronic apparatus which generates implicit terrain data according to an embodiment.

Referring to FIG. 1, the electronic apparatus 101 may read original terrain data generated based on contours, aerial photographs, satellite images, or the like. The original terrain data may be digital elevation data representing altitude values according to a terrain. The electronic apparatus 101 may extracts nodes forming the original terrain data.

The electronic apparatus 101 may generate implicit terrain data based on the original terrain data. In detail, the electronic apparatus 101 may set the nodes of the original data as nodes for the implicit terrain data. That is, the electronic apparatus 101 may map three-dimensional (3D) coordinates representing each node of the original terrain data to a node of the implicit terrain data.

The electronic apparatus 101 may perform lossless compression on the generated implicit terrain data. In detail, lossless compression may be a compression method of setting initial characteristic nodes from the implicit terrain data. Further, lossless compression may be a method of interpolating the set initial characteristic nodes and applying a greedy algorithm based on an implicit surface to add characteristic nodes.

Lossless compression may interpolate at least four or more initial characteristic nodes of the implicit terrain data set first for lossless compression to determine the implicit surface. Lossless compression may compare a height value of a node of the original terrain data with a height value of the implicit surface to identify whether an error in height value is greater than a preset tolerance. When the error is greater than the tolerance, lossless compression may add a characteristic node having the height value of the node of the original terrain data.

That is, the error in height value being greater than the tolerance may mean that a real height value of terrain is not obtained by interpolating the at least four or more initial characteristic nodes, that is, there is a topographical difference between the original terrain data and the implicit terrain data. Thus, the electronic apparatus 101 may add a characteristic node calculated similar to terrain of the original terrain data to the implicit surface considering that the error in height value is greater.

Ultimately, lossless compression may add characteristic nodes such that the implicit surface interpolated based on the initial characteristic nodes included in the implicit terrain data is similar to the original terrain, thereby generating the implicit terrain data in which the finally interpolated implicit surface has the same height value as those of the nodes of the original terrain data.

The electronic apparatus 101 may reconstruct the losslessly compressed implicit terrain data. In detail, the electronic apparatus 101 may rearrange the characteristic nodes based on a distance between characteristic lines from the original terrain data and the characteristic nodes constructed. The electronic apparatus 101 may reconstruct the implicit terrain data by rearranging the order of the characteristic nodes.

Further, the electronic apparatus 101 may perform lossy compression using the characteristic nodes of the reconstructed implicit terrain data. In detail, the electronic apparatus 101 may perform lossy compression of removing part of back characteristic nodes in the order among the characteristic nodes rearranged in order according to the distance between the characteristic lines and the characteristic nodes. Here, the characteristic nodes are rearranged based on similarity according to the distance from the characteristic lines, specifically in descending order of similarity. The electronic apparatus 101 may perform lossy compression through a filtering process of removing the characteristic nodes rearranged according to the distance.

The electronic apparatus 101 may store the lossily compressed implicit terrain data in a database 102. The electronic apparatus 101 may calculate an implicit surface of the implicit terrain data stored in the database 102 considering a resolution of the implicit terrain data. Here, the electronic apparatus 101 may visualize the implicit terrain data in a mesh form through a display capable of visualizing a digital image. The electronic apparatus 101 may visualize the implicit terrain data in connection with a receiving terminal 103 capable of visualizing the implicit surface.

Figure 2:
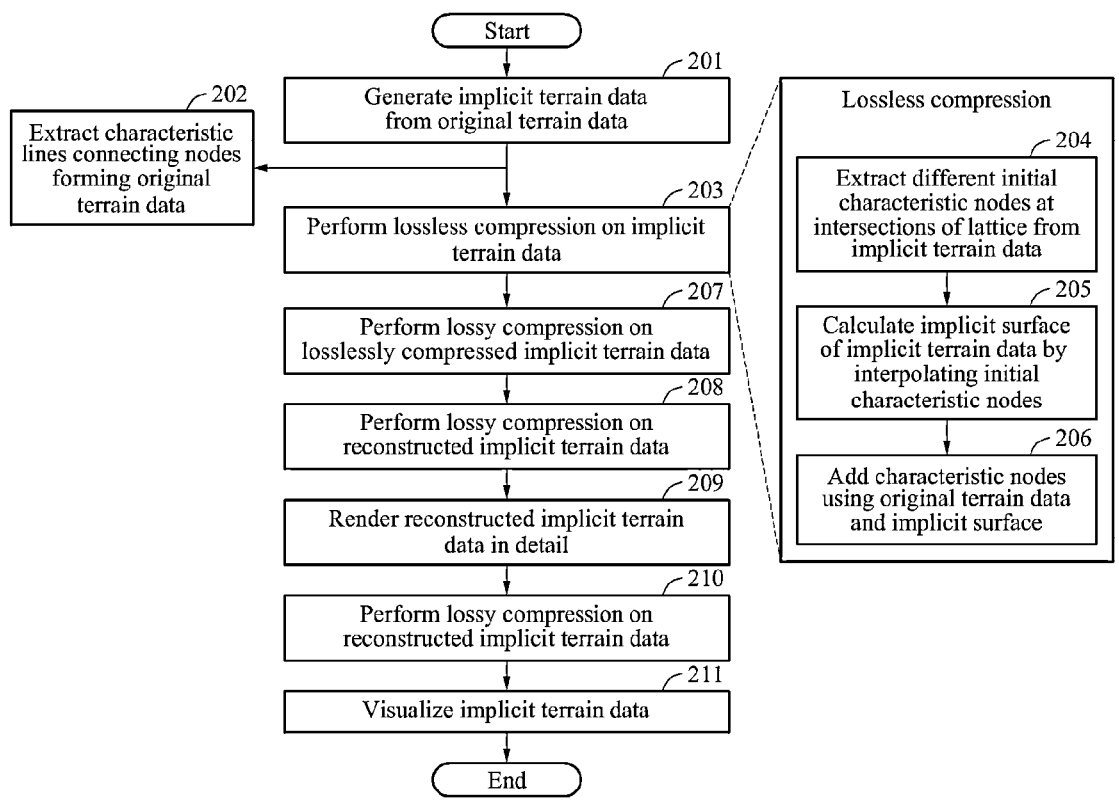
FIG. 2 is a flowchart illustrating a method of generating implicit terrain data according to an embodiment.

FIG. 2 is a flowchart illustrating a method of generating implicit terrain data according to an embodiment.

In operation 201, the electronic apparatus may read original terrain data generated based on contours, aerial photographs, satellite images, or the like. The electronic apparatus may extract nodes forming the original terrain data. Here, the nodes of the original terrain data may have different height values depending on positions. The height values of the nodes may be one of 3D coordinates for representing 3D terrain. The height values of the nodes may be expressed as an integer based an error in designated resolution of the original terrain data and refer to an elevation value based on terrain.

The nodes of the original terrain data include 3D coordinates corresponding to the original terrain data or the height values only, that is, may include different values depending on a method for the electronic apparatus 101 reading the original terrain data. For instance, the nodes of the original terrain data may include general coordinates for representing 3D terrain, for example, 3D coordinates in a form of (x, y, h). When the nodes of the original terrain data are disposed at regular intervals using a lattice, coordinates (x, y) are implicitly identified, and thus the nodes may include the height values (h) only.

In operation 202, the electronic apparatus may extract characteristic lines from the original terrain data. In detail, the electronic apparatus may extract the characteristic lines of the original terrain data using a profile recognition and polygon breaking algorithm (PPA). The PPA may be used to obtain representative features by detecting topographical unevenness of terrain by profile recognition and removing insignificant features through polygon breaking.

That is, the electronic apparatus may extract characteristics points corresponding to the nodes of the original terrain data by utilizing the PPA. The electronic apparatus may connect the nodes of the original terrain data corresponding to the extracted characteristic points, thereby extracting a characteristic line representing a medial axis.

In operation 203, the electronic apparatus may generate implicit terrain data from the original terrain data. The electronic apparatus may set all nodes forming the original terrain data as characteristic nodes of the implicit terrain data, so that the characteristic nodes may include 3D coordinates in a form of (x, y, h) like the nodes of the original terrain data.

In operation 204, the electronic apparatus may perform lossless compression on the generated implicit terrain data. In detail, in operation 205, the electronic apparatus may set an initial characteristic node among the nodes of the implicit terrain data, in which a different number of initial characteristic nodes may be set based on a method of interpolating an implicit surface. For instance, the electronic apparatus may automatically set four nodes corresponding to four corners of the implicit terrain data as initial characteristic nodes. Also, the electronic apparatus may set the initial characteristic nodes in a matrix form based on the method of interpolating the implicit surface. That is, for lossless compression of the implicit terrain data, the electronic apparatus may set the initial characteristic nodes in a different form based on the method of interpolating the implicit surface, instead of extracting the initial characteristic nodes with a separate method.

A greedy algorithm may be used to calculate a height value at any position by interpolating an implicit surface constructed from the set initial characteristic nodes and added characteristic nodes. Subsequently, the greedy algorithm may repeat a process of comparing a height value of a node of the original terrain data with a height value of the implicit surface and adding a node having a greatest difference as a characteristic node until an error in height value is within a tolerance.

That is, the electronic apparatus may perform lossless compression to extract a minimum number of characteristic nodes such that the implicit surface is constructed by interpolating height values of all nodes of the original terrain data as they are.

In operation 206, the electronic apparatus may calculate the implicit surface of the implicit terrain data by interpolating the initial characteristic nodes and the characteristic nodes. In detail, the implicit surface of the implicit terrain data may be defined by an interpolation function (s) satisfying a condition $(s(c_i)=h_i, i=1, \ldots, N, s:\mathbb{R}^2 \to \mathbb{R})$ when height value data $(\{h_i\}_{i=1}^N \subset \mathbb{R})$ is given with respect to coordinate data $(C=\{c_i\}_{i=1}^N \subset \mathbb{R}^2, c=(x, y))$ on the characteristic nodes included in the implicit terrain data.

There are various types of interpolation functions, a softest form of which may be $s(c)=p(c)+\Sigma_{i=1}^N \lambda_i \phi(|c-c_i|)$. Here, c may be coordinates of a random node a height value of which is to be calculated, and $c_i$ may be coordinates of a characteristic node. Here, $p(c)=k_1+k_2x+k_3y$. Further, the interpolation function may be calculated as a sum of a basis function $\phi(r)$, $r=|c-c_i|$. Here, the basis function may be a function of a distance between a random node and a characteristic node. Various forms of basis functions may be used, for example, thin-plate spline radial basis function (RBF) $\phi(r)=r^2\log(r)$, Gaussian RBF $\phi(r)=\exp(-kr^2)$, multi-quadric RBF $\phi(r)=\sqrt{r^2+k^2}$, Bi-harmonic RBF $\phi(r)=r$, and Wendland RBF $\phi(r)=(1-r)^4(4r+1)$. Gaussian RBF and Wendland RBF where $\phi(r)=0$, $r \geq 1$ may be referred to as Compactly-Supported RBF.

The interpolation function may be used to find solutions of N+3 unknown values of a weighting $\lambda_i$, $i=1, \ldots, N$ for the basis function and correction values $k_1$, $k_2$, $k_3$ for increasing precision of interpolation using conditions $s(c_i)=h_i, i=1, \ldots N$ and $\Sigma_{i=1}^N \lambda_i = \Sigma_{i=1}^N \lambda_i x_i = \Sigma_{i=1}^N \lambda_i y_i = 0$ given from the characteristic nodes of the implicit surface. This process may be referred to as fitting. When the interpolation function for the implicit surface is determined, the interpolation function may evaluate the height value $h_\alpha = s(c)_\alpha$ at coordinated $c_\alpha$ of a random node. However, when a characteristic node is added in constructing the implicit surface, the foregoing conditions allocated to the interpolation function may change as the characteristic node is added, and thus the weighting and the correction values may be recalculated.

That is, the electronic apparatus may spend a great amount of time in fitting the implicit surface and in calculating the height value. Here, the electronic apparatus may use known methods, for example, fast multipole method (FMM) or partition of unity principle (PoU), to reduce calculation time. In addition, a compactly supported RBF may be used to decrease calculation time.

In operation 207, the electronic apparatus may determine a characteristic node using the nodes of the original terrain data and the initial characteristic nodes of the implicit surface. In detail, the electronic apparatus may compare the height values of the nodes of the original terrain data with the height value of the implicit surface interpolated with the initial characteristic nodes and add a characteristic node including a height value at coordinates having a maximum error. Further, the electronic apparatus may repeat the foregoing process until the height value of the implicit surface interpolated with added characteristic nodes is exactly the same as the height value of the node of the original terrain data. Here, the characteristic nodes may be stored in descending order of contribution to similarity between the nodes of the original terrain data and the nodes of the implicit terrain data.

The electronic apparatus may adopt a concept of similarity between the original terrain data and the implicit surface to generate an implicit drawing showing similar terrain to the original terrain data. That is, the electronic apparatus may perform lossless compression on the implicit surface generated based on terrain of the implicit terrain data so that the implicit surface has a highest level of similarity with the original terrain data, that is, is generated the same as the original terrain data with a minimum number nodes.

In operation 208, the electronic apparatus may reconstruct the losslessly compressed implicit terrain data. The electronic apparatus may reconstruct the characteristic nodes based on an implicit model of the losslessly compressed implicit terrain data according to purposes. In detail, the characteristic nodes of the losslessly compressed implicit terrain data may be arranged according to contribution to similarity with the original terrain. Here, similarity between the implicit terrain and the original terrain may be measured as a sum of squares of differences in height value or an average height value.

Here, as a characteristic node is added, the characteristic nodes may not always be arranged in such a way that the similarity increases or an imbalance in a similarity increase may arise. Generally, the similarity tends to continuously increase as characteristic nodes are added to the implicit terrain data, while the similarity may decrease depending on a situation. The similarity may increase at different rates depending on areas, and thus a similarity imbalance may be detected.

Considering such characteristics of the similarity, the electronic apparatus may rearrange the characteristic nodes of the implicit terrain data such that the similarity generally and continuously increases. Therefore, the electronic apparatus may rearrange the characteristic nodes in a manner of changing order of characteristic nodes when a distance between adjacent characteristic nodes is an allowable value or smaller considering regional distribution of characteristic nodes added to increase overall similarity with respect to the characteristic nodes.

That is, the electronic apparatus may rearrange the characteristic nodes by repositioning characteristic nodes according to the foregoing rearrangement method, so that similarity with respect to the specific nodes does not decrease and a similarity imbalance may be avoided.

Examining positions of added characteristic nodes through the greedy algorithm, characteristic nodes may be mostly generated according to a ridge and valley of the original terrain at first. The characteristic nodes positioned at the ridge and valley may be disposed in a front or rear position in the order with respect to the ridge and valley based on a level of contribution to the similarity. In detail, characteristic nodes corresponding to extremely winding positions of the original terrain have a high level of contribution to the similarity and thus may be disposed in front of the ridge and valley in the order. On the contrary, characteristic nodes corresponding to less winding positions of the original terrain have a low level of contribution to the similarity and thus may be disposed in back of the ridge and valley in the order.

Further, the characteristic nodes may be rearranged in the order so as to highlight the ridge and valley which are distinct features of the original terrain. To this end, the electronic apparatus may extract characteristic lines representing the ridge and valley from the original terrain through the PPA. The electronic apparatus may calculate a distance between the characteristic lines and the characteristic nodes and rearrange the characteristic nodes such that characteristic nodes having a shorter distance, that is, being closer to the characteristic lines, are disposed at a front position in the order. Also, the electronic apparatus may calculate a distance between the characteristic lines and the characteristic nodes and rearranges the characteristic nodes such that characteristic nodes having a longer distance are disposed at a back position in the order.

In operation 209, the electronic apparatus may render the reconstructed implicit terrain data in detail. The electronic apparatus may group the characteristic nodes and allocate a level of detail to each group. Generally, when terrain is visualized from a high elevation, a detailed shape of the terrain is hard to identify from terrain data but distinctive features of the terrain, such as valleys and ridges, are possibly observed mainly.

Thus, the electronic apparatus may reconstruct the original terrain using the characteristic nodes of the implicit terrain data only, without applying 100% of the original terrain to the terrain data to reconstruct the terrain data.

That is, the electronic apparatus may reconstruct the implicit terrain data using only the characteristic nodes based on the similarity proportionate to an elevation from which the terrain is observed. To this end, the electronic apparatus may adjust a similarity level calculated considering all characteristic nodes in the order rearranged through the process of measuring similarity and a corresponding node and the characteristic nodes to a value from 0 to 1 and map a similarity level to each of the characteristic nodes.

Here, a similarity level is allocated to each of all characteristic nodes, because a data size excessively increases when the terrain is reconstructed using similarity levels of the nodes of the original terrain data. For example, the electronic apparatus may suppose that a node interval of the original terrain data is 10 meters (m). The implicit terrain data losselessly compressed and reconstructed based on the original terrain data may generate a terrain model by interpolating a height value at various node intervals of 0.1, 1, 2 and 5 m from the implicit surface.

Here, while generating the terrain model, as the terrain is observed from a high elevation, the terrain model may be interpolated with a higher value than a node interval of the original terrain data. Here, when the terrain model is interpolated wrongly, detailed information originally included in the terrain model may be lost.

Thus, the electronic apparatus may reconstruct the terrain model using the characteristic nodes in a lower level of detail than the original terrain so that the original terrain is reconstructed without losing the detailed information on the terrain. That is, as an area of the terrain to visualize is expanded with an elevation from which the terrain is observed being higher, the electronic apparatus may involve an increase in computing load needed for reconstructing the terrain. Thus, the electronic apparatus may decrease similarity to a unit of the terrain model in proportion to the increase in computing load with the area to visualize expanding, thereby reducing a number of characteristic nodes and computing loads needed for reconstructing the terrain. Accordingly, the electronic apparatus may reduce computing loads for reconstructing the terrain model, thereby maintaining constant overall computing loads involved in reconstructing the terrain model.

To this end, the electronic apparatus may divide the entire similarities into a plurality of ranges according to a similarity level and record only a position of a characteristic node having a starting level of each range, thereby grouping the characteristic nodes and allocating a level of detail to each group. For example, the electronic apparatus may divide the characteristic nodes and nodes corresponding to the characteristic nodes into four ranges, 0.0~0.25, 0.25~0.5, 0.5~0.75 and 0.75~1.0, according to a similarity level and allocate a level of detail to the groups.

In operation 210, the electronic apparatus may perform lossy compression on the reconstructed implicit terrain data. The electronic apparatus may filter the characteristic nodes of the reconstructed implicit terrain data. In detail, the losslessly compressed and reconstructed implicit terrain data may be used to reconstruct the original terrain as it is using the initial characteristic nodes and the characteristic nodes. Although a size of the implicit terrain data is reduced by removing part of the characteristic nodes disposed at the back position in the arrangement, the implicit terrain data may keep similar terrain to the original terrain overall.

That is, when the characteristic nodes are rearranged such that similarity generally and continuously decreases, the electronic apparatus may remove the characteristic nodes one by one, from a back position in the order, thereby easily performing lossy compression.

The electronic apparatus may perform minimum lossy compression on the nodes to based on similarity with respect to the high-capacity data, thereby providing the data to a user without a substantial deterioration in quality of the terrain of the original terrain data.

In operation 211, the electronic apparatus may calculate the implicit surface using the nodes of the implicit terrain data stored in the database. The electronic apparatus may convert the implicit surface into a mesh form to visualize the implicit surface through the display.

In detail, the electronic apparatus may connect neighboring vertexes, which are sampled height values at regular intervals on the implicit surface, thereby visualizing the implicit surface in the mesh form.

The electronic apparatus may divisionally transmit the nodes of the implicit terrain data according to the order to the receiving terminal capable of visualizing the implicit surface. The receiving terminal may divisionally receive the nodes of the implicit terrain data according to the order and construct the terrain based on the initial characteristic nodes of the implicit terrain data according to the received order. Subsequent, the receiving terminal may add characteristic information additionally received to the constructed terrain, thereby gradually visualizing the implicit terrain data, while improving similarity thereof.

The electronic apparatus and a receiving apparatus are devices capable of visualizing the implicit terrain data, which may serve as a navigation system for a moving object, such as a car, ship and air plane.

Figure 3:
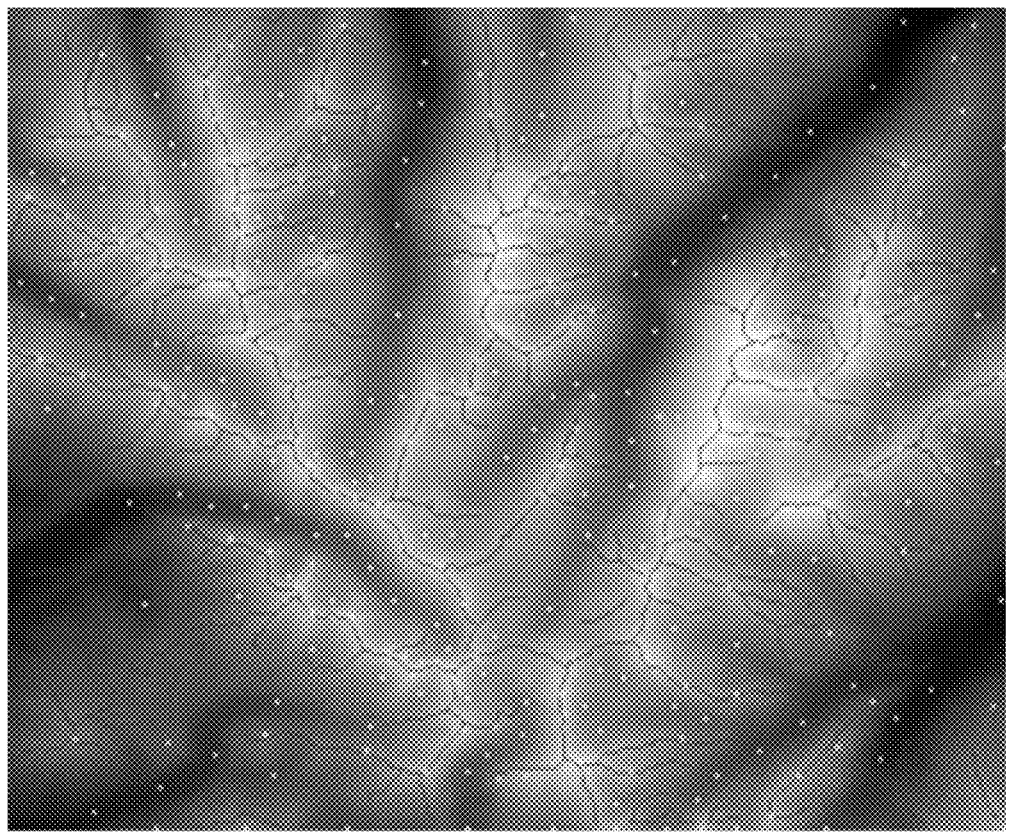
FIG. 3 illustrates a characteristic line and a characteristic node of implicit terrain data according to an embodiment.

FIG. 3 illustrates characteristic lines and characteristic nodes of implicit terrain data according to an embodiment.

Referring to FIG. 3, the electronic apparatus may visualize characteristic lines representing ridges and valleys extracted from original terrain data, and initial characteristic nodes and characteristic nodes forming an implicit surface of the implicit terrain data.

That is, the original terrain data may represent a height value with a brightness of a color by each node in rectangular terrain, wherein a higher chroma of a color may indicate a higher elevation. The characteristic lines may be extracted through the PPA and represent the ridges and valleys. The initial characteristic nodes and characteristic nodes of the implicit surface generated from the original terrain data are shown in white dots and may be distributed in a similar manner to the characteristic lines of the original terrain data. For example, the implicit terrain data may shows a height at each node with black for a greater height and white for a lower height. Lines may represent the characteristic lines of the implicit terrain data, and the white dots may represent the characteristic nodes of the implicit terrain data.

Here, the electronic apparatus may sequentially receive the initial characteristic nodes and the characteristic nodes arranged based on a level of detail from the database and visualize the implicit terrain data while gradually raising similarity based on a level of detail.

Figure 4:
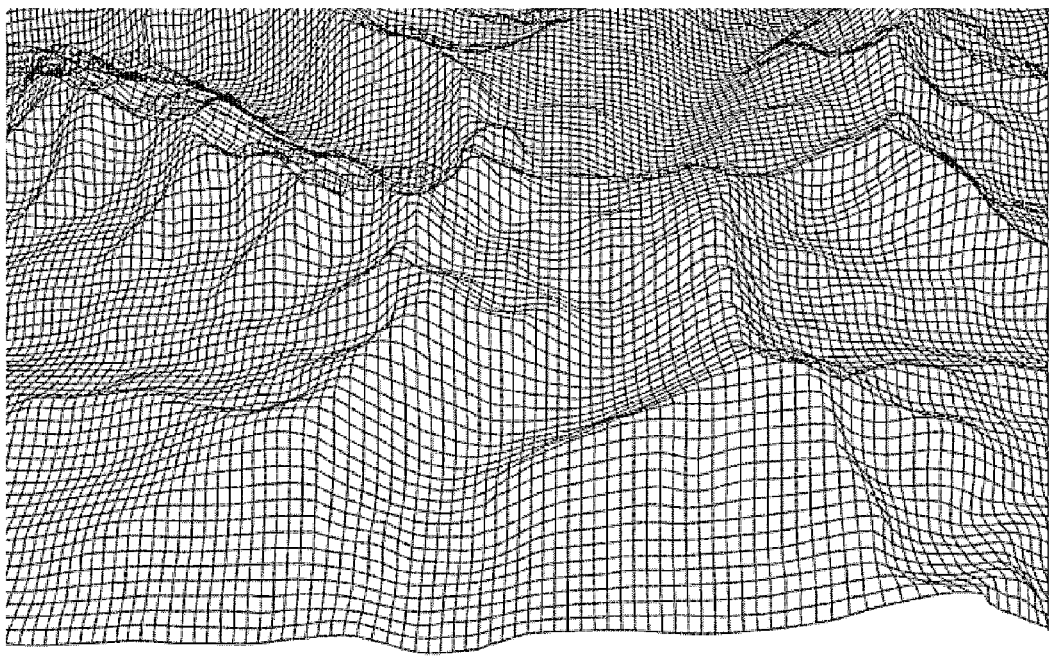
FIG. 4 illustrates visualized implicit terrain data in a mesh form according to an embodiment.

FIG. 4 illustrates visualized implicit terrain data according to an embodiment.

Referring to FIG. 4, the electronic apparatus may visualize implicit terrain data in 3D terrain. That is, the electronic apparatus may designate height values sampled at regular intervals on an implicit surface from the implicit terrain data as vertexes. The electronic apparatus connects the designated vertexes with neighboring vertexes to convert into a mesh form and visualize the mesh form through a rendering process.

The electronic apparatus may serve as a navigation system for a moving object, such as a car, ship or air plane.

The apparatuses described herein may be implemented using hardware components, software components, and/or combinations of hardware components and software components. For instance, the units and components illustrated in the embodiments may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor or any other device capable of responding to and executing instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave in order to provide instructions or data to the processing device or to be interpreted by the processing device. The software may also be distributed over network coupled computer systems so that the software is stored and executed in a distributed fashion. The software and data may be stored by one or more non-transitory computer readable recording mediums.

The methods according to the embodiments may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents. Thus, other implementations, alternative embodiments and equivalents to the claimed subject matter are construed as being within the appended claims.

DESCRIPTION OF THE REFERENCE NUMERALS

101: Electronic apparatus
102: Database
103: Receiving apparatus

The invention claimed is:

1. A method of generating implicit terrain data, the method comprising:
   constructing implicit terrain data from original terrain data;
   performing lossless compression on the implicit terrain data;
   reconstructing the losslessly compressed implicit terrain data; and
   performing lossy compression on the reconstructed implicit terrain data,
   wherein the performing of the lossless compression comprises:
      extracting initial characteristic nodes from nodes of the implicit terrain data;
      generating an implicit surface of the implicit terrain data by interpolating the initial characteristic nodes; and
      adding characteristic nodes using the original terrain data and the implicit surface,
   wherein the reconstructing comprises reconstructing the losslessly compressed implicit terrain data by rearranging the added characteristic nodes using a characteristic line representing a medial axis connecting characteristic points of the original terrain data, the characteristic line being generated by connecting characteristic points forming a valley and a ridge, and
   wherein the rearranging comprises rearranging the added characteristic nodes in proportion to a distance between the characteristic line and the added characteristic nodes.

2. The method of claim 1, wherein the constructing comprises constructing the implicit terrain data using a height value of a node forming the original terrain data.

3. The method of claim 1, wherein the initial characteristic nodes are nodes set first according to an interpolation method for generating the implicit surface among the implicit terrain data, and the characteristic nodes are added in consideration of a preset tolerance based on comparison between a height value of a node of the original terrain data and a height value of the implicit surface.

4. The method of claim 1, wherein the implicit surface comprises a height value of a random position that is obtained through an interpolation between an initial characteristic node representing a preset height value and the initial characteristic nodes.

5. The method of claim 1, wherein the adding comprises adding a characteristic node having a height value substantially the same as a height value of a node of the original terrain data when a difference between a height value of the original terrain data and a height value of the implicit surface obtained by interpolating the initial characteristic nodes is greater than a preset tolerance as a result of comparing the height value of the original terrain data with the height value of the implicit surface.

6. The method of claim 1, wherein, in the rearranging, an added characteristic node having a larger distance from the characteristic line is positioned in a farther back position in an rearranged order of the added characteristic nodes.

7. The method of claim 6, wherein the performing of the lossy compression comprises reducing a size of the implicit terrain data by sequentially filtering out the rearranged added characteristic nodes from the added characteristic node in the farther back position in the rearranged order of the added characteristic nodes.

8. The method of claim 1, further comprising visualizing the lossily compressed implicit terrain data by converting the lossily compressed implicit terrain data into a mesh form.

9. The method of claim 8, wherein the visualizing comprises visualizing the lossily compressed implicit terrain data by calculating the implicit terrain data to extract a height value of each of nodes according to a resolution, connecting three-dimensional (3D) coordinates of the nodes to generate a mesh, and mapping the generated mesh to a texture.

10. An electronic apparatus which generates implicit terrain data, the electronic apparatus comprising:
a processor,
wherein the processor conducts:
generating implicit terrain data using a height value of nodes forming original terrain data;
performing lossless compression using nodes of the implicit terrain data;
reconstructing the losslessly compressed implicit terrain data; and
performing lossy compression on the reconstructed implicit terrain data using the original terrain data and the implicit terrain data,
wherein the performing of the lossless compression comprises:
extracting initial characteristic nodes from the implicit terrain data;
generating an implicit surface of the implicit terrain data by interpolating the initial characteristic nodes; and
adding characteristic nodes using the original terrain data and the implicit surface,
wherein the reconstructing comprises reconstructing the losslessly compressed implicit terrain data by rearranging the added characteristic nodes using a characteristic line representing a medial axis connecting characteristic points of the original terrain data, the characteristic line being generated by connecting characteristic points forming a valley and a ridge, and
wherein the rearranging comprises rearranging the added characteristic nodes in proportion to a distance between the characteristic line and the added characteristic nodes.

11. The electronic apparatus of claim 10, wherein the implicit surface comprises a height value of a random position that is obtained through an interpolation between an initial characteristic node representing a preset height value and the initial characteristic nodes.

12. The electronic apparatus of claim 10, wherein the adding comprises adding a characteristic node having a height value substantially the same as the height value of the nodes forming the original terrain data when a difference between a height value of the nodes forming the original terrain data and a height value of the implicit surface obtained by interpolating the initial characteristic nodes is greater than a preset tolerance as a result of comparing the height value of the nodes forming the original terrain data with the height value of the implicit surface.

13. The electronic apparatus of claim 10, wherein, in the rearranging, an added characteristic node having a larger distance from the characteristic line is positioned in a farther back position in an rearranged order of the added characteristic nodes.

14. The electronic apparatus of claim 13, wherein the performing of the lossy compression comprises reducing a size of the implicit terrain data by sequentially filtering out the rearranged added characteristic nodes from the added characteristic node in the farther back position in the rearranged order of the added characteristic nodes.

15. The electronic apparatus of claim 10, further comprising visualizing the lossily compressed implicit terrain data by converting the lossily compressed implicit terrain data into a mesh form.

16. The electronic apparatus of claim 15, wherein the visualizing comprises visualizing the lossily compressed implicit terrain data by calculating the implicit terrain data to extract a height value of each of nodes according to a resolution, connecting three-dimensional (3D) coordinates of the nodes to generate a mesh, and mapping the generated mesh to a texture.

* * * * *